July 5, 1949. H. J. HERSEY, JR 2,475,389
HOSE
Filed Jan. 13, 1944 4 Sheets-Sheet 1

INVENTOR.
BY Henry J. Hersey Jr.
ATTY.

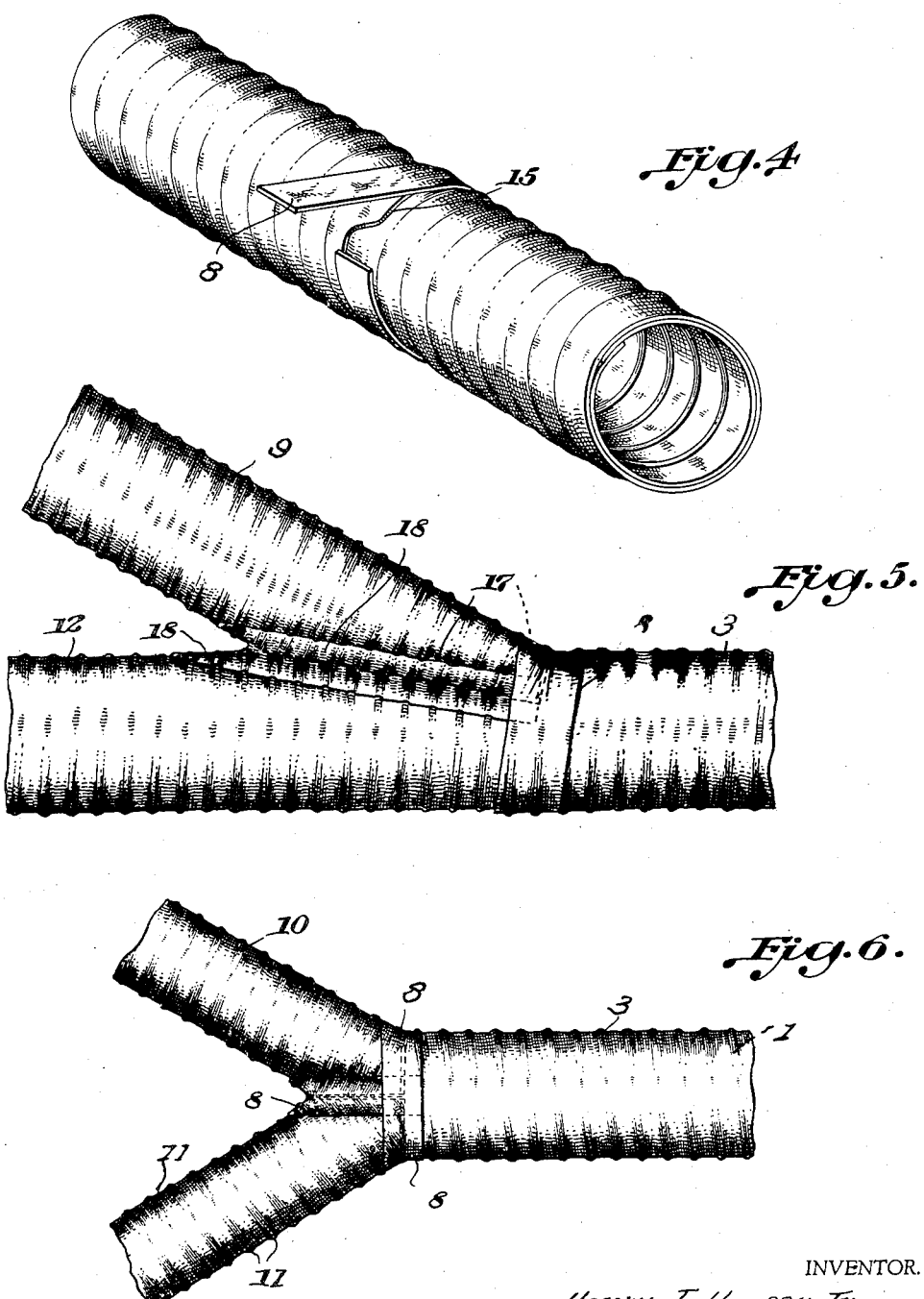

July 5, 1949.  H. J. HERSEY, JR  2,475,389
HOSE

Filed Jan. 13, 1944  4 Sheets-Sheet 3

INVENTOR.
Henry J. Hersey Jr.
BY
ATTY.

July 5, 1949. H. J. HERSEY, JR 2,475,389
HOSE
Filed Jan. 13, 1944  4 Sheets-Sheet 4
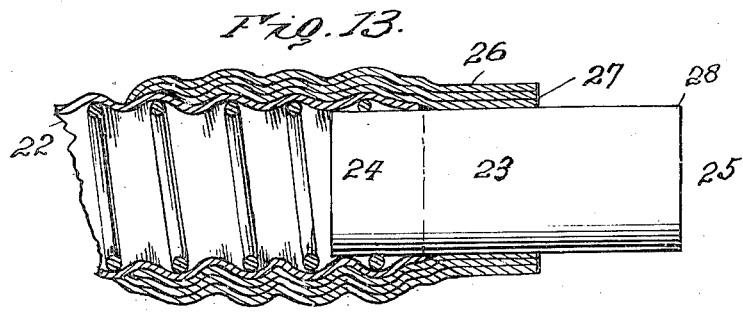
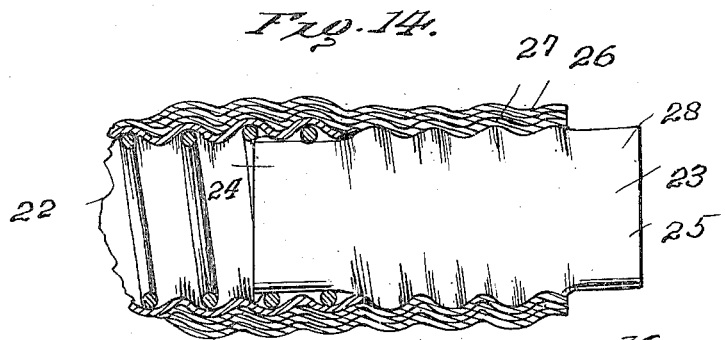
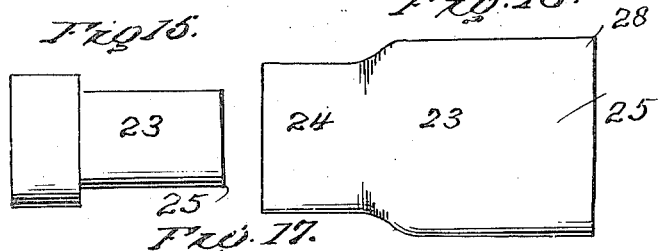
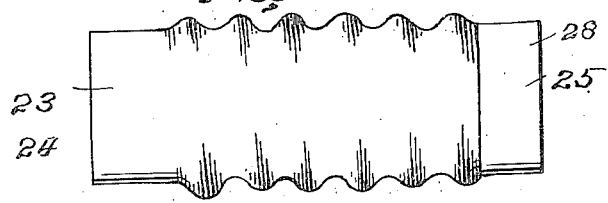
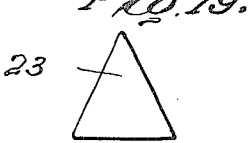

Patented July 5, 1949

2,475,389

UNITED STATES PATENT OFFICE 2,475,389

HOSE

Henry J. Hersey, Jr., Seattle, Wash., assignor to American Ventilating Hose Co., New York, N. Y., a corporation of Washington Application January 13, 1944, Serial No. 518,113

3 Claims. (Cl. 138—49)

This invention is directed to a method of making and the construction of a hose or hose section of the type requiring flexibility, light weight, and sturdiness in use.

The primary object of the present invention is the provision of a hose section, designed to be spliced to or with similar or like sections to form a hose of the desired length, with each such section, when mechanically complete in hose form, being bodily dipped into a vat or other container in which there is a sufficient quantity of a cementitious and sealing composition in liquid form to completely cover the section, the dipping operation being perfected with a view of coating the inner and outer surfaces of the section with a more or less even, smooth, and relatively thin coating of the composition to insure an effective sealing and bonding function of the parts of the section.

A further object of the invention is the provision more particularly of a hose section of a predetermined length constructed for convenient and effective splicing with other similar sections, to form a hose of any desired length, with the material employed, the manner of its assembly, and the treatment following assembly, serving to form a hose of desired and requisite flexibility.

An essential characteristic of the improved hose section is the utilization of fabric or like material formed or arranged in tubular form, and preferably provided with means for preventing collapse of the section, with such means providing a more or less accordion-form for flexibility and bending in use and application, the material and elements of the section being responsive to sealing and bonding in subsequent treatment to provide strength and prevent leakage.

Another important characteristic of the improved hose section is the sealing and bonding of the section parts by dipping the structurally complete section into a vat of an appropriate cementitious and sealing compound to insure the application of a bonding and sealing application to the hose section, with the dipping being repeated, or otherwise carried out, to insure that the coating, when finally dried, shall be in the form of an even, relatively thin, and equally distributed coating for the most effective sealing and bonding.

Another important characteristic of the improved hose section is its capability and formation to permit its effective splicing with similar or other hose sections to provide a hose of any desired length, the splicing formation and operation being such as to insure a strong, sealed, and direct junction between the sections, in a simple, economical, and rapid operation.

The invention, in illustration of the method steps and of the mechanical construction, is illustrated in the accompanying drawings, in which:

Fig. 4 is a similar view showing the completion of the splicing connection.

Fig. 5 is a perspective view showing the formation of the hose section as a branch-hose form.

Fig. 6 is a similar view, showing the hose section formed as a Y-hose section.

Figure 13 is a broken sectional view showing more or less diagrammatically the formation of a hose connector on the end of a hose section.

Figure 14 is a similar view showing a different form of connector.

Figure 15 is a view of a forming element for forming a connector of less diameter than that of the hose section.

Figure 16 is a similar view of a forming element for forming a connector of greater diameter than that of the hose section.

Figure 17 is a similar view wherein the element is formed to provide a connector for threaded connection with the end of a hose section.

Figures 18 and 19 are end views of forming elements for providing hose connectors of square and triangular contour respectively.

In the form of hose section shown in Figs. 1 to 9, inclusive, but which is not to be understood as the preferred form, a reinforce 1, preferably in the form of a wire length, is wound spirally on a mandrel 2 of a size and length to form a hose section of the desired length and diameter. A layer of appropriate material, preferably somewhat porous fabric, 3, is wrapped over the reinforce 1 on the mandrel, the meeting edges of the layer 3 being lapped and secured, as by pinning or the use of a cementitious and sealing material, as liquid rubber dispersion, to form an effective bond and seal.

Figures 1, 2, 3, 7, 8:
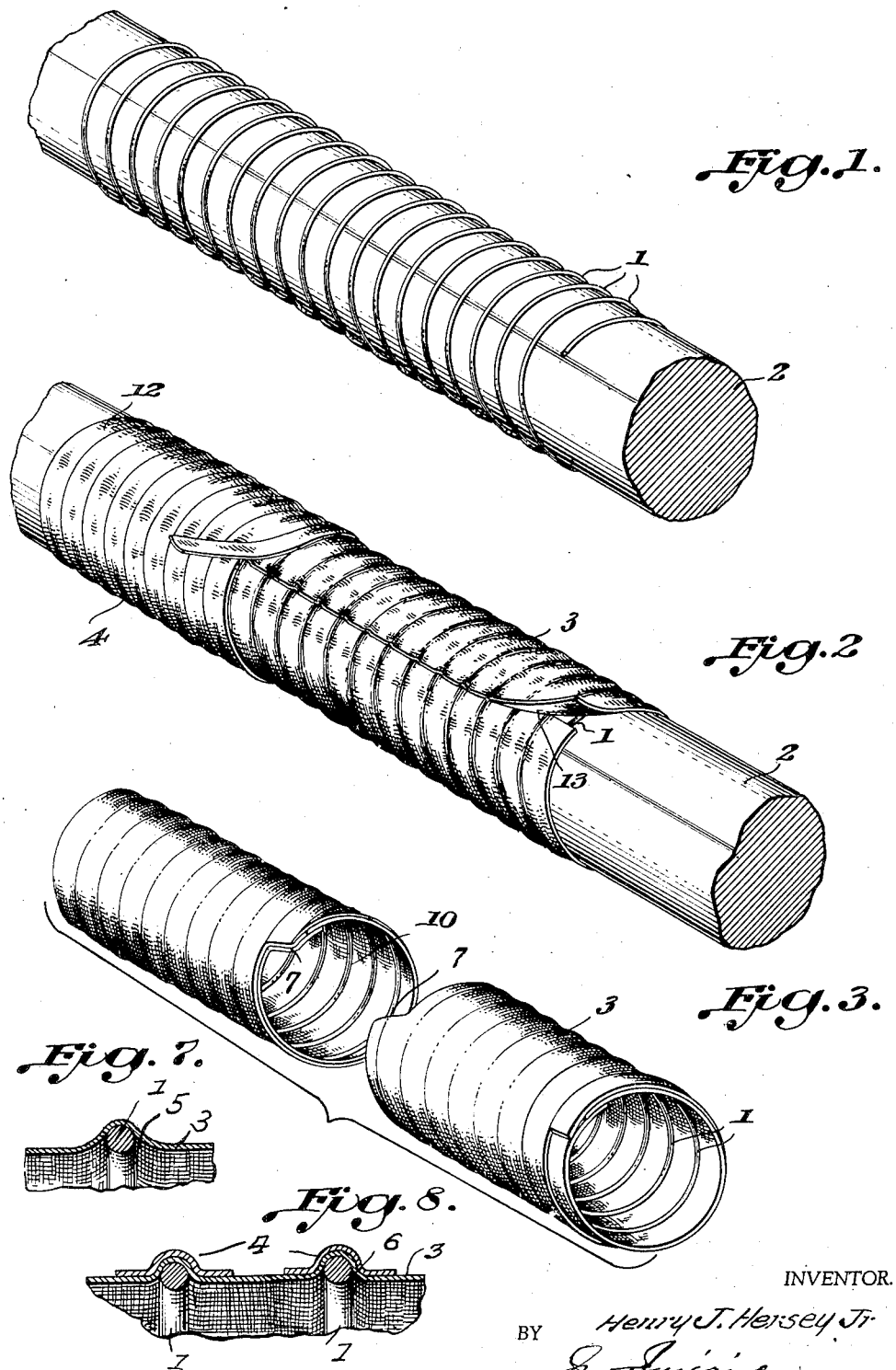
Fig. 1 is a perspective view, showing the initial method step in making one type of hose section.
Fig. 2 is a similar view illustrating successive steps in forming this type of hose.
Fig. 3 is a broken perspective view showing the completed section of this type of hose formed for splicing or endwise connection with adjacent hose sections.
Fig. 7 is a sectional detail, showing the relation of the fabric body and reinforce prior to the application of the tape binding.
Fig. 8 is a similar view showing the relation of the fabric body and reinforce following application of the tape binding.
Figure 9:
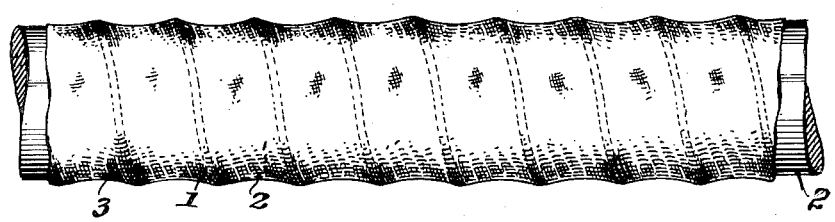
Fig. 9 is an elevation showing a variation of the inner reinforce of the hose section to vary the flexibility of the complete hose section.

A binding length, as a relatively narrow tape or cord-like strip 4 is then wound tightly over the fabric body 3, and directly overlying the wire convolutions of the reinforce. The tape is applied under sufficient tension to more or less contract the body layer 3 about the wire, as clearly shown in Fig. 8. As apparent in Fig. 7, the body layer 3, when applied over the wire length or reinforce 1, will contact the outer edge of such wire and then diverge more or less widely from the wire, leaving relatively wide spaces 5, which are objectionable for reasons to be referred to. The tight application of the tape 4 binds the body layer 3 much closer to the wire, as indicated at 6, Fig. 8, reducing the spaces about the wire. As the tape 4 is relatively narrow, the adjacent edges of the adjacent convolutions of the tape are spaced, as best shown in Fig. 8, to expose the fabric wrapper 3 between the convolutions of tape so that its application does not interfere with the flexibility of the hose section between the convolutions of the reinforce 1.

The next method step is the coating of the interior and exterior of the formed hose section. This, according to the present invention, is by bodily submerging, preferably by dipping, the formed hose sections into a vat containing an appropriate liquid composition, as for example a rubber or plastic dispersion. After each of repeated dippings, made necessary for a purpose to be explained, the hose section is suspended vertically to insure as rapid and complete gravital discharge of excess material as possible and avoid any material thickening of the coating in spots as would naturally follow hardening or coagulation if allowed to dry in any other position. Even under proper gravital draining it will be apparent that the material will harden or coagulate in moving toward the lower end of the vertically suspended section, so that the coating will tend to be somewhat thicker toward the lower end than at the upper end of the section. To overcome this objection, each section is reversed in each subsequent dipping to insure a more even thickness of the coating throughout the length of the section. Of course the dippings of each section, including end reversal of the section at each successive dipping, will be continued until the thickness of the coating is that desired or determined necessary in the particular hose formation.

The reduction of the space 6 through the use of the tape 4 becomes important in connection with the dipping step. By confining the space 6, by the application of the tape 4, the material of the coating is permitted to fill the space 6 and encase the reinforce 1, to thereby bind the reinforce and body 3 and further provide for a more complete coplanar relation of the portions of the body 3 between the convolutions of the reinforce.

The present invention is directed more particularly to the provision of a relatively short length hose section, and obviously the sections must be adapted for splicing end to end for forming into hose of desired length. To provide for this result the formed sections, completed as described, are formed for interfitting, as at 7, Fig. 3, and the formed ends are coated with a relatively heavy layer of cementitious sealing material, as rubber or plastic dispersion. The sections are then forced tightly together and by reason of the nature of the coating will be found to adhere with a considerable resistance to separation. A binding tape 8 is wrapped around the joint for two or more turns, being drawn tightly in place. The material of the tape 8 is of more or less porous fabric material, and in the wrappings will take up the cementitious and sealing material from the heavy layer at the joint. The fabric of the wrapping will be, by this absorption, completely sealed and cemented in place, completing the splice with very material resistance to separation or other inherent weakness. If desired, and as preferred the material may then be cured in any conventional manner to further insure the integrity of the splice.

The dispersion applied at the joint will naturally, by reason of its nature and similarity to the dispersion used in coating the interior and exterior of the section, combine with such coating, making a completely homogeneous junction of the full or substantially full strength of the section per se, so that the hose, made up of any desired number of sections spliced by the described method, will present a substantially integral uniform structure, without inherent weakness at any point.

In the splicing of the joints the reinforce 1 may be disregarded, and the respective sections thereof need not be connected, as such is unnecessary, as the primary purpose of the reinforce is to prevent collapse of a section, and effectively carries out this purpose with necessity of interconnection in splicing the sections.

The improved hose sections readily lend themselves to the formation of branch type or Y-type hose sections for a particular use and purpose. In Fig. 5 the hose section is cut out to receive a branch section 9, which may be individually made up as is the main section. The main and branch sections are formed for interfitting and communication by appropriate cutting, and a union is effected and a sealing junction provided in the manner described in connection with the splicing of the sections. The Y-type section, shown in Fig. 6 is constructed of two branches 10 and 11, fitted and secured to the end of the main section, the formation and method employed being substantially similar to that described in the previously indicated splicing step.

Figure 10:
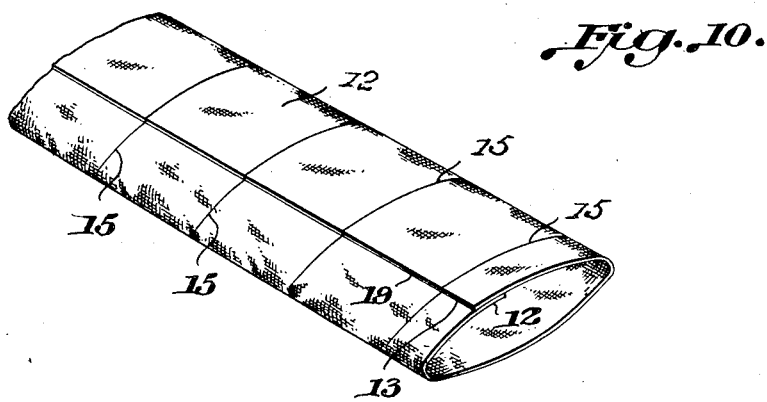
Fig. 10 is a perspective view showing the initial steps in forming a hose section by a somewhat different method.
Figure 11:
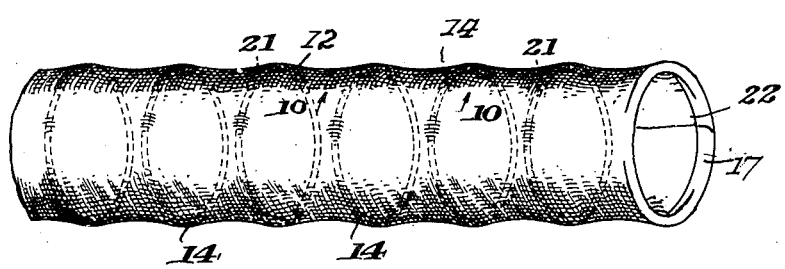
Fig. 11 is a similar view showing the final structural step in this type of hose section.
Figure 12:
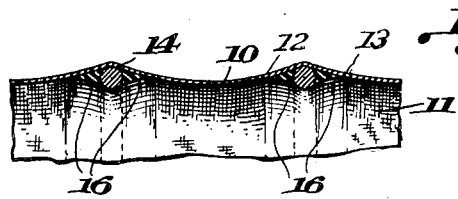
Fig. 12 is a broken longitudinal section of Fig. 11, showing the bonding use of the coating material.

Figs. 10, 11, and 12 show a somewhat different method of making a hose section according to this invention. In this type an appropriate length of fabric 12 is formed into a hollow tube-like body 13, with the lapped edges secured, as by the use of rubber or plastic dispersion. Rings 14 of metal or other material of requisite strength, are then inserted in the body 13. The rings are of an external diameter somewhat greater than the internal diameter of the body, so that it is necessary to distend or spread the body 13 to permit placing of the rings. If desired, the exterior of the body 13 may be marked, as at 15, to indicate the desired spacing of the rings, and the latter may vary in number and spacing in accordance with the requirements of the desired flexibility of the section.

After the rings 14 are positioned, the dipping step described in connection with the first form is carried out, and as indicated at 16 in Figure 12, the coating material will more or less encase the rings, and securely bond the rings and fabric. The ends of the fabric 12 are turned over the end rings, as at 17.

The length of hose section produced in either form is predetermined in order that it may be conveniently handled, constructed, dipped and completed. The facility with which such sections may be spliced for forming any hose length provides a real advantage in the relatively short hose sections, both for construction, ease of handling, transportation, and ability to make up a short length or a long length hose as may be required at the time.

Having described the constructions of the hose sections as using wire, fabric, and rubber or plastic dispersion, it will be nevertheless understood that any and all materials which fulfill the requirements of this use and function are contemplated as within the spirit of the present invention.

A particular means and method of providing hose sections for ready and convenient connection, one with another, or for providing a hose section shown in Figures 1 to 9 inclusive, for terminal connection with any shape or size of fitting to which the hose is to be connected is shown in Figures 15 to 19 inclusive and forms an important object of the present invention.

In carrying out the method and providing the apparatus for this connection, the hose section proper, indicated at 22 in Figures 13 and 14, is, after an incomplete series of dipping steps as previously described, terminally provided with a connection forming plug 23, preferably but not necessarily of polished metal in solid or hollow form. The plug is formed at one end, as at 24, to fit more or less snugly within the end of the formed but incompletely dipped hose section 22. The remaining length 25 of the plug extends beyond the end of the hose section 22, and it is this length 25 which provides the connection or cup end of the hose section. This length 25 of the plug, as will later appear, is to be formed in accordance with the form of the connection desired. However, regardless of the form of section 25 of the plug, the connecting cup proper of the hose section is formed in the following manner. After the plug is in position in the end of the hose section, successive layers of fabric material 26, corresponding to the fabric used in the hose section, are tightly wrapped over the end of the hose section in line with the inserted portion 24 of the plug and over the extended portion 25 of the plug, tightly fitting and snugly conforming to the surface formation of the portion 25 of the plug. Each layer of fabric 26 is heavily impregnated with rubber dispersion or other plastic or cementitious material, as in the hose section formation, and after such, is more or less dried, the plug is withdrawn, and the additional dipping steps of the hose section, with its now added and practically integral terminal connection or cup section 27, are continued to bring the hose section and its cup connector to finished condition. The cup connection will thus be fixedly and inseparably united with and form in effect an integral part of the hose section proper, and after proper dipping, can not be readily distinguished in formation from the hose section.

Of course, that section of the connection which is formed over the extended portion 25 of the plug is the section of the complete unit which provides for the connection of one hose section with another in forming different hose lengths, or in providing for the connection of a terminal hose length to a fixture of any type, and obviously, this section 25 of the plug may be in any reasonable form or size.

For example, if the connection is made for joining hose sections into a particular hose length, the length 25 of the plug may be exteriorly formed as a somewhat loose replica of the exterior form of the hose section proper. This is shown in Figure 14, and when the plug has been withdrawn, of course by an unscrewing movement, the cup extension may be readily screwed onto the normal end of another hose section to form an efficient and practically non-leaking connection between the sections.

If the cup connection is to be made for joining a section or hose length to a fitting or machine fixture, the section 25 of the plug may be appropriately formed to fit such part. Thus, such plug part 25 and the resulting hose end formation 27 may be square in cross section, as in Figure 18, triangular as in Figure 19, or round, with such portion of either greater or smaller diameter than that of the body of the hose section proper, such being shown in Figures 16 and 15, respectively.

The sole requisite is the proper sizing and forming of the plug section 25, for, after applying the fabric sections 26 and finally dipping the section, the cup connection will be found to maintain its shape with all requisite rigidity when free and yet sufficiently yielding to permit it being clamped on a fitting if such be necessary or desired.

It is desirable that the length 25 of the plug be of somewhat greater length than that of the completed cup connection 26, to provide an uncovered end of such plug for convenience in withdrawing such plug, as at 28.

What I claim is:

1. A hose section including a fabric tubular section and internal reinforce spirally wound within the fabric section to form by such reinforce a predetermined form of the fabric tubular section, and an external binding for the tubular fabric section including a tape to directly overlie the fabric section in line with the internal reinforce, the tape being applied in line with the reinforce and extending on both sides of the position of the reinforce and being of a width to leave a portion of the fabric section exposed between the adjacent edges of the tape to thereby permit a free flexibility of the hose portion intermediate the windings of the tape.

2. A hose section including a fabric tubular section and internal reinforce spirally wound within the fabric section to form by such reinforce a predetermined form of the fabric tubular section, and an external binding for the tubular fabric section including a tape to directly overlie the fabric section in line with the internal reinforce, the tape being applied in line with the reinforce and extending on both sides of the position of the reinforce and being of a width to leave a portion of the fabric section exposed between the adjacent edges of the tape to thereby permit a free flexibility of the hose portion intermediate the windings of cementitious and sealing material to cover the of the tape, and an internal and external coating exposed internal and external areas of the fabric section and the external area of the tape.

3. A hose section including a fabric tubular section of predetermined form, an internal spiral wire reinforce wound within the fabric section to form such section into a cylindrical formation, a tape wound about the tubular fabric section and the reinforce to completely overlie and extend in both directions beyond the portions of the tubular fabric section overlying the reinforce, the tape being tensioned to force the tubular fabric section to conform with the reinforce and hold the fabric section in a position about the reinforce to maintain the lengths of fabric section on each side of the reinforce in substantially the same plane longitudinally of the fabric section, the tape having a width to avoid overlapping or abutting its adjacent edges to thereby leave a portion of the fabric section exposed as the tape is applied.

HENRY J. HERSEY, Jr.

REFERENCES CITED

The following references are of record in the file of this patent:

UNITED STATES PATENTS

| Number | Name | Date |
|---|---|---|
| 132,006 | Harris | Oct. 8, 1872 |
| 713,560 | Dodge | Nov. 11, 1902 |
| 1,229,175 | Christopherson | June 5, 1917 |
| 1,349,586 | Siegel | Aug. 17, 1920 |
| 1,396,789 | Short | Nov. 15, 1921 |
| 1,457,781 | Loughead | June 5, 1923 |
| 1,736,106 | Williamson | Nov. 19, 1929 |
| 1,836,489 | Oden | Dec. 15, 1931 |
| 1,937,069 | Rado | Nov. 28, 1933 |
| 2,019,709 | Kennedy | Nov. 5, 1935 |
| 2,091,265 | Brown | Aug. 31, 1937 |
| 2,144,478 | Baumgratz | Jan. 17, 1939 |
| 2,146,275 | Thompson | Feb. 7, 1939 |
| 2,146,559 | Berkowitz | Feb. 7, 1939 |
| 2,176,762 | Forbes | Oct. 17, 1939 |
| 2,241,355 | Maclachlan | May 6, 1941 |
| 2,245,758 | Chernack | June 17, 1941 |

FOREIGN PATENTS

| Number | Country | Date |
|---|---|---|
| 349,965 | Great Britain | May 27, 1931 |
| 792,388 | France | Oct. 21, 1935 |